United States Patent [19]

Carroll, Jr.

[11] Patent Number: 5,192,609
[45] Date of Patent: Mar. 9, 1993

[54] THERMOFORMABLE SHEET MATERIAL

[75] Inventor: John F. Carroll, Jr., Rochester, N.Y.

[73] Assignee: Eastman Kodak Company, Rochester, N.Y.

[21] Appl. No.: 821,297

[22] Filed: Jan. 13, 1992

Related U.S. Application Data

[63] Continuation of Ser. No. 457,915, Dec. 27, 1989, abandoned, which is a continuation-in-part of Ser. No. 267,906, Nov. 7, 1988, Pat. No. 4,900,611.

[51] Int. Cl.$^5$ .................... B32B 5/16; B32B 7/12
[52] U.S. Cl. .................... 428/328; 428/208; 428/329; 428/343; 428/354
[58] Field of Search .............. 428/328, 329, 208, 354, 428/343

[56] References Cited

U.S. PATENT DOCUMENTS

| | | | |
|---|---|---|---|
| 3,988,494 | 10/1976 | McAdow | 428/328 |
| 4,396,672 | 8/1983 | Adesko | 428/331 X |
| 4,499,143 | 2/1985 | Panush | 428/336 |
| 4,598,015 | 7/1986 | Panush | 428/336 X |
| 4,719,132 | 1/1988 | Porter, Jr. | 427/409 |
| 4,731,290 | 3/1988 | Chang | 428/335 |
| 4,753,829 | 6/1988 | Panush | 428/328 X |
| 4,769,100 | 9/1988 | Short | 156/285 |
| 4,810,540 | 7/1989 | Ellison | 428/31 |
| 4,818,589 | 4/1989 | Johnson et al. | 428/349 X |
| 4,828,637 | 5/1989 | Short | 156/212 |
| 4,857,372 | 8/1989 | Ginkel et al. | 428/352 X |
| 4,900,611 | 2/1990 | Carroll, Jr. | 428/328 X |
| 4,921,755 | 5/1990 | Carroll, Jr. et al. | 428/328 |

FOREIGN PATENT DOCUMENTS 230364 7/1987 European Pat. Off. .
285071 10/1988 European Pat. Off. .

OTHER PUBLICATIONS

Research Disclosure 24303, Jul. 1984 "A Method for Obtaining Prepainted Parts Using a Painted Carrier Film".

Primary Examiner—George F. Lesmes
Assistant Examiner—D. R. Zirker
Attorney, Agent, or Firm—William J. Davis; J. Jeffrey Hawley

[57] ABSTRACT

A thermoformable basecoat/clearcoat sheet material having improved retention of geometric metamerism (flop) when stretched and bonded to a substrate comprises a carrier film having a dark basecoat layer and, over the basecoat layer, a transparent layer which contains light reflective metallic flakes and, over the flake layer, a clear topcoat layer.

17 Claims, 1 Drawing Sheet

THERMOFORMABLE SHEET MATERIAL

RELATED APPLICATIONS

This application is a continuation of application Ser. No. 07/457,915 filed Dec. 27, 1989, now abandoned, which in turn is a continuation-in-part of the application of John F. Carroll, Jr., Ser. No. 267,906, filed Nov. 7, 1988, now U.S. Pat. No. 4,900,611.

FIELD OF THE INVENTION

This invention relates to flexible, thermoformable sheet materials that are capable of being stretched and bonded to a three-dimensional substrate to form a protective and decorative surface thereon. It also relates to articles having bonded thereto such a sheet material.

BACKGROUND OF THE INVENTION

As an improvement over the spray painting of articles such as automobile bodies, boats and household appliances, a new kind of paint-coated sheet material (also called paint-coated film) has been developed to provide protective and decorative finishes. The new material comprises a flexible, stretchable, thermoplastic carrier film which has a protective and decorative paint layer of uniform thickness and appearance on one side, and, optionally, an adhesive layer on the other side. It can also have other layers such as a tie or bonding layer between the paint layer and the carrier film. In a preferred embodiment, a transparent topcoat covers the paint layer to provide an attractive basecoat-clearcoat appearance. Especially desirable is a paint-coated film having a so-called metallic paint layer which contains light-reflective flakes of metal, mica or the like.

Using known vacuum thermoforming procedures, these paint-coated films can be stretched and bonded to an article such as an automobile body panel to give a basecoat-clearcoat finish. Advantages of using such paint-coated films instead of spray painting the automobile include improved control of evaporating solvents, which reduces air pollution, and the reduction of paint sludge as a hazardous waste product. Furthermore, the new paint-coated film has a remarkably smoother and more attractive appearance than spray painted finishes. This new type of thermoformable sheet material and a process for its manufacture are described in the U.S. patent application of G. G. Reafler, Ser. No. 116,426, filed Nov. 3, 1987 now abandoned, and PCT International Publication Number WO 89/04251 of May 18, 1989. The process involves applying the paint composition to the surface of the thermoplastic carrier film by laminar flow coating, followed by drying and then coating and drying each additional layer in sequence to obtain a paint-coated film of excellent gloss and smoothness.

The laminar flow coating technique is especially advantageous in orienting any light-reflecting flakes in the paint layer in a relationship parallel to the carrier film with the result that the basecoat-clearcoat finish has a high degree of geometric metamerism, also referred to as goniochromatism or "flop". This is the ability of a paint film to exhibit subtle variations in color and appearance depending upon the directions from which it is illuminated and viewed. The effect is produced by light reflective flakes, e.g., metal flakes, incorporated in the paints. For further discussion of the optical mechanism of "flop", see the patent to Short, U.S. Pat. No. 4,199,489 and the patent to Alman, U.S. Pat. No. 4,479,718.

The aesthetics of paint-coated films are also influenced by reflected image sharpness and shininess. These characteristics are known in the paint industry as "distinctness of image" (DOI) and "gloss", respectively.

Although metallic paint-coated films offer great promise as substitutes for the spray-painting of automobile parts and other three-dimensional substrates, the fact that the films must stretch during thermoforming does present problems. It appears that when the film stretches, the light-reflective flakes in the paint layer rearrange in such a way that the film tends to lose some of its valuable surface properties such as flop, gloss and DOI, the loss being greater as the degree of stretching increases.

The present invention offers a solution to the problem of loss of flop, gloss and DOI in stretched areas of metallic paint-coated films. It can be used alone or in combination with other procedures to reduce the loss of such properties.

SUMMARY OF THE INVENTION

In accordance with this invention, it has been found that a flexible and stretchable basecoat/clearcoat sheet material having a particular basecoat configuration and composition, when stretched and thermoformed onto a substrate, shows unexpectedly an improved retention of flop and other surface properties in stretched or extended areas. The sheet material of the invention comprises a series of layers including (a) a stretchable, thermoplastic polymeric carrier film having heat-softenable and tensile elongation properties which adapt it to use in a thermoforming process and (b) a clear topcoat layer;

one of said series of layers being dark colored;

above said dark colored layer, a flake-containing layer which is light transmissive and comprises light-reflective flakes dispersed in a transparent film-forming binder;

the flake concentration in the flake-containing layer being sufficiently low that the dark colored layer is visible through the flake-containing layer and the topcoat; all of said layers having heat-softening and tensile elongation properties that are compatible with those of the carrier film; and said sheet material being capable of stretching at least 100 percent during thermoforming and, when stretched, exhibiting a flop in areas stretched up to 100 percent at least equal to the flop of the unstretched material.

The new sheet material is further distinguished by also resisting the deterioration of other visual surface characteristics such as gloss and DOI during stretching.

In preferred embodiments, the material has:
 a) a flop of at least 95 in both unstretched and stretched areas;
 b) a 20° gloss of at least 80 in both unstretched and stretched areas; and
 c) a DOI of at least 75 in unstretched areas and at least 35 in stretched areas.

Also in preferred sheet materials of the invention, the outer basecoat layer is essentially free of non-flake colorant.

The invention also includes a bonded article comprising a substrate to which sheet material of the invention is bonded.

BRIEF DESCRIPTION OF THE DRAWINGS

The invention will be further described by reference to the drawings, of which.

DETAILED DESCRIPTION

This invention provides an improved thermoformable sheet material having a flake-containing layer, which sheet material, as a consequence of the novel combination of layers, has unexpectedly high flop and retention of flop when stretched during thermoforming to 100 percent or more in area. In the novel sheet material, a transparent layer which contains light-reflective flakes is formed above a dark colored layer. Other layers, e.g., other dark colored layers and other flake-containing layers can also be present, provided they do not preclude the visibility of the dark colored layer through the transparent flake-containing layer.

By "dark-colored layer" is meant a layer which is substantially darker than the overlying transparent flake-containing layer. This provides a contrast in light reflectivity. Quantitatively, this can be expressed in terms of the lightness value, $L^*$, of the dark colored layer.

$L^*$ (or "lightness") is the CIELAB value which represents the attribute of color perception by which a non-self luminous body is judged to reflect more or less light. In order to achieve the contrast which provides the flop improvement described herein, the light reflective flakes of the types indicated should be coated over a dark colored layer which has an $L^*$ value less than about 60 and, preferably, less than about 30 and, most preferably, less than about 10. Especially preferred are black and dark blue layers having $L^*$ values, for example, of about 5 and 7 respectively, and which are overcoated with transparent paint layers containing aluminum flakes. Other useful dark colored paint layers have $L^*$ values as follows: dark green, 37 and dark red, 29. In comparison, approximate $L^*$ values for typical light colored basecoats are as follows: white, 98; ivory, 86; and beige, 63.

Figure 1:
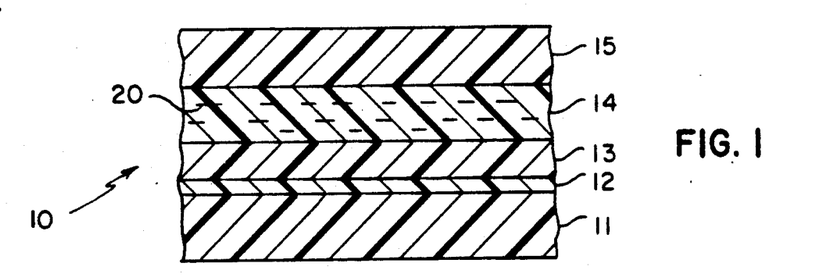
FIGS. 1-2 show enlarged cross-sections, not to scale, of protective and decorative sheet materials in accordance with the invention.

FIG. 1 is a diagrammatic cross-sectional sideview, not to scale, of one embodiment of a thermoformable sheet material 10 of the invention. Layer 11 is a flexible and stretchable, thermoplastic polymeric carrier film. Coated on the carrier film 11 are a dark colored basecoat layer 13 and, coated over the basecoat layer is a flake-containing layer 14. Coated over the flake-containing layer 15 is a clear topcoat layer 15.

Although not always essential, a thin tie layer 12 can be coated and dried on the carrier film before the dark basecoat layer is coated, in order to improve the bonding of the basecoat to the carrier film 11.

Figure 2:
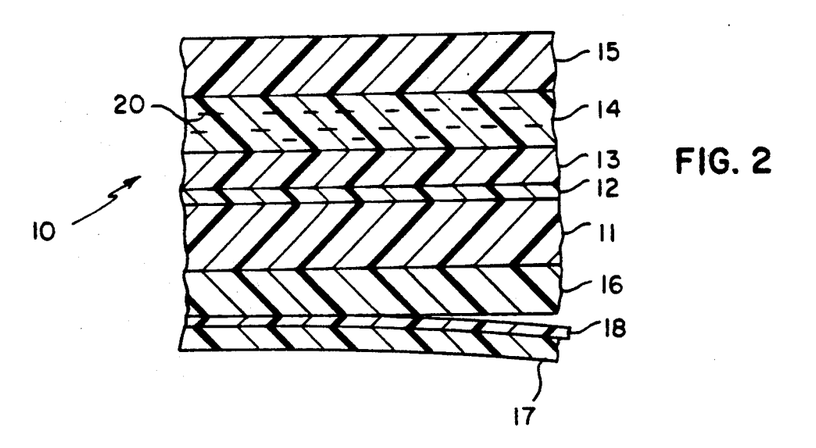

FIG. 2 shows a sheet material having, coated on the surface of the carrier film opposite to the dark basecoat layer, a pressure-sensitive adhesive back layer 16. This provides a means for securely bonding the sheet material to a substrate such as an exterior automobile body panel. Following the application of the adhesive layer 16, the sheet material preferably is releasably bonded to a thin release sheet 17 of, e.g., polyester film to permit tack-free winding of the finished sheet material on a core. An optional silicone release coating 18 can be on the release sheet 17 to aid in stripping it from the adhesive back layer prior to thermoforming the sheet material to a substrate. Although a pressure-sensitive adhesive layer is preferred for vacuum thermoforming, heat-activated or other adhesive layers can be used.

The method by which the layers of the product are formed uniformly on the carrier film preferably is laminar flow coating, as disclosed in the Reafler patent application Ser. No. 116,426, filed Nov. 3, 1987, now abandoned. Also they are dried, as disclosed in the Reafler patent application, by means of a flat bed dryer having a vertical loop curing section and being provided with low velocity streams of heated air.

Although laminar flow coating of the layers is highly preferred because of the excellent quality of such coating (especially the substantially parallel orientation of the light-reflective flakes) and because of the control of environmental emissions that laminar flow coating affords, the layers can be applied by less desirable methods. Other such coating methods that have been proposed for paint coated films include spraying and reverse roll coating as described in, for example, the patent to Short et al, U.S. Pat. No. 4,769,100 (General Motors), European Patent Application 285,071 A2, published Oct. 5, 1988 (Avery International Corp.); European Patent Application 266,109 A2 published May 4, 1988 (Rexham Corp.) which corresponds to U.S. Pat. No. 4,810,540; European Patent Application 230,364 published Jul. 29, 1987 (3M Company); and Research Disclosure No. 24303, July 1984.

The carrier film for the sheet material is an essentially planar, self-supporting, stretchable, flexible, thermoplastic polymeric film which can be transparent, translucent or opaque. It has a substantially uniform thickness, preferably in the range from about 0.05 to 0.40 millimeter. A preferred thickness is in the range from about 0.10 to 0.30 millimeters.

The carrier film has heat softening and tensile elongation properties suitable for the thermoforming process. Preferred polymeric materials for the film are those known to be useful in thermoforming and/or vacuum-forming techniques, such as polyvinyl chloride, polyvinyl acetate, ABS (acrylonitrile-butadiene-styrene) resins, polyethylene and polypropylene. Useful carrier film materials include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film materials exhibit a tensile elongation at break of at least about 40 percent when measured in accordance with ASTM D-638. A highly preferred carrier film material is a blend of copolyesters based on poly(1,4-cyclohexylenedimethylene terephthalate) and rubber-modified styrene-maleic anhydride copolymers as described in U.S. Pat. No. 4,582,876. A specific example of a polymer blend of this kind which can be extruded as a carrier film consists of a blend of 55:45% by weight of a copolyester and "Dylark 600" styrene copolymer. The latter is a rubber-modified styrene-maleic anhydride copolymer obtained from ARCO Chemical Company, a division of Atlantic Richfield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends of a flexible poly(etherester) with a more rigid polyester as described in the copending application of Seymour, Ser. No. 151,727 filed Feb. 7, 1988, now U.S. Pat. No. 4,904,748. The carrier film can include fillers, UV absorbers, plasticizers, colorants, antioxidants, etc, known to be useful in polymeric films.

Colored basecoat layers for the sheet materials comprise a dark colorant incorporated in a film forming binder. Conventional dark colorants for paint compositions can be employed, including inorganic pigments such as iron oxide, chromium oxide, lead chromate, carbon black, metallic oxides, silicates, chromates, etc., and organic pigments or dyes, such as phthalocyanine blue, phthalocyanine green, carbazole violet, indanthrone blue, quinacridone violet, perylene reds, diazo red and others known to those skilled in the art. Light colored basecoat layers such as yellow, ivory and white, having L* values greater than 60 do not provide the high retention of flop in stretched areas which characterizes the sheet material of the present invention.

The transparent flake-containing layer can contain any light-reflective particles conventionally employed in paints, particularly those employed in automotive finish paints. Suitable reflective particles include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass, and aluminum coated polyester film fragments. Mixtures of two or more types of particles can be used. Although not all of these light-reflective flakes are metals, they give a metallic appearance to the paint-coated film. Hence for convenience, all paints which contain light-reflective flakes are referred to herein as metallic paints. Of these light-reflective flakes the most highly preferred are aluminum flakes and mica flakes. The size of the flakes can vary considerably. Flakes having a maximum planar dimension or diameter from about 10 to 200 mm are suitable. Preferably, the flake size or maximum diameter is the range from about 20 to 90 mm.

The coverage or concentration of flakes in the flake-containing upper layer can also vary considerably, provided that the concentration is sufficiently low that the layer remains light transmissive and preferably transparent. The term "transparent" as used herein includes lightly tinted paint layers through which objects or images can be clearly seen. A flake concentration in the range from about 50 to 2000 mg/m$^2$ is generally satisfactory. Best results in retention of flop with stretched film have been obtained when the flake coverage is in the transparent flake-containing layer is in the range from about 100 to 500 mg/m$^2$. With aluminum flakes when the flake coverage is as high as about 3000 mg/m$^2$, the flake layer is normally not sufficiently transparent and the dark colored layer is not sufficiently visible through it to provide the preferred degree of flop retention when the film is stretched. Accordingly, preferred sheet materials of the invention have a flake concentration in the flake layer less than 3000 mg/m$^2$, more preferably from 50 to 2000 mg/m$^2$ and, most preferably, from 100 to 500 mg/m$^2$.

Whatever the flake concentration in the flake-containing layer, it must be sufficiently high that at least about 2 percent, and preferably at least about 10 percent, of the area of the dark colored layer as viewed through the flake-containing layer is covered by flakes. As previously mentioned, the flake concentration in the flake-containing layer is sufficiently low that the layer is light-transmissive, so that the underlying dark layer is visible through it. For best results, the concentration of flakes is such that no more than about 30 percent and, preferably, no more than about 20 percent, is covered by flakes.

The embodiments described above with reference to FIGS. 1-3 wherein a dark colored basecoat layer is coated on the carrier film and a transparent flake-containing layer is coated over the basecoat layer are preferred embodiments which have exceptionally good retention of flop, gloss and DOI when stretched. However, the invention broadly includes sheet materials having a series of layers which include a carrier film and a clear topcoat layer and wherein at least one of the layers is dark colored and wherein, above the dark layer, is a transparent flake-containing layer through which the dark layer is visible. The word "above" as used herein means that the flake-containing layer is more distant than the dark layer from the side or surface of the sheet material which is to be bonded to a substrate. Hence, when the sheet material is bonded to a substrate, the viewer sees the dark under layer through the clear topcoat and through the transparent flake-containing layer.

Figure 3:
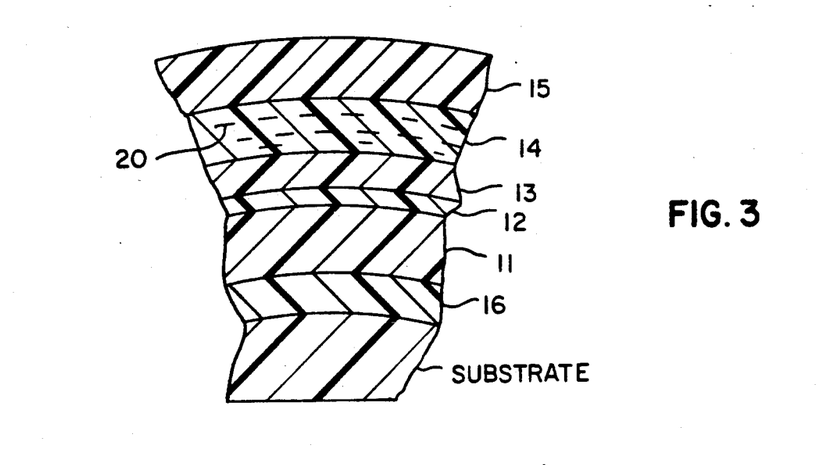
FIG. 3 is a fragmentary cross-sectional view of a paint coated article in accordance with this invention.

Thus, while the embodiments of FIGS. 1-3 are preferred, other embodiments of sheet materials within the broad scope of the invention are also useful and can provide improved retention of flop when the sheet material is stretched and bonded to a substrate. One example of such other embodiments is a sheet material in which the carrier film contains a dark colorant and, therefore, need not be overcoated with a dark basecoat paint. The flake-containing layer is then coated above the dark colored carrier film.

Such a carrier film can be colored by melt-blending a dark pigment or dye with the carrier film polymer composition before extruding the film. This embodiment is like the sheet material of FIG. 1, but omits the dark colored paint layer 13. Instead, the carrier film 11 contains a dispersed dark colorant.

In another embodiment, the dark colored layer is formed by dispersing a dark colorant in the adhesive layer. A flake-containing layer is formed above it. In one such embodiment, with reference to FIG. 2, the paint layer 13 is omitted and a dark colorant is blended in the adhesive composition before the adhesive layer 16 is coated on the carrier film 11. In this embodiment, the carrier film should be transparent so that the dark adhesive layer 16 is visible through it.

In another embodiment employing a dark colored adhesive layer, the flake-containing layer is coated between the carrier film 11 of FIG. 2 and the colored adhesive layer 16 and the paint and flake layers 13 and 14 are omitted. Again the carrier film must be transparent in order that the flake and colored layers are visible through it. In this case, if the carrier film is sufficiently mar-resistant, or if high mar-resistance is not a requirement, the clear topcoat 15 can also be omitted and the carrier film serves as a clear layer over the flake layer.

In still another embodiment, the carrier film can contain the light-reflective flakes. Thus, referring to FIG. 2, carrier film 11 is extruded from a polymer composition that contains a dispersion of light-reflective flakes and the adhesive layer 16 coated on one side of the carrier film contains a dark colorant. On the other side, with or without tie coat 12, is coated the clear topcoat 15. The paint and flake layers 13 and 14 are omitted. This embodiment has the advantage that coating and drying operations are minimized, with consequent economy in manufacturing costs. It is even possible to co-extrude the flake-containing carrier film and the clear top layer. This would further reduce the number of coating and drying steps. In this case, however, the parallel orientation of the flakes is not expected to be as good as in coated layers. Especially, it would not be as good as in a flake-containing layer which is coated by laminar flow coating.

The sheet material of the invention has light-reflective flakes in a layer above a dark-colored layer. It is also possible, however, for the flake-containing layer to contain a small concentration of non-flake pigment and for the dark colored layer to contain a small concentration of light reflective flakes. The colorant concentration in the flake layer must be sufficiently low that the layer remains light transmissive, and that likewise, the flake concentration in the dark layer must be sufficiently low that the color of the non-flake pigment is visible in viewing it through the flake layer. In general, the flake coverage of the dark colored layer should not exceed about 50 mg/m$^2$. The size of the flakes, if any, in the dark layer can be smaller, larger or the same as in the overlying flake layer.

The film-forming binder for the dark colored paint layer and for the flake-containing layer can comprise any of the film-forming resins conventionally used as binders in basecoat compositions. Particularly useful resinous binders are acrylic polymers, polyesters, including alkyds, and polyurethanes. Examples of such binders and method for the preparation thereof are described in U.S. Pat. Nos. 4,681,811; 4,403,003 and 4,220,679.

Most of the polymers described in the above references are organic solvent-based polymers, although acrylic polymers can be prepared via aqueous emulsion polymerization techniques and used as aqueous-based basecoat compositions. Water-based basecoats in color-plus-clear compositions are disclosed in U.S. Pat. No. 4,403,003, and the resinous compositions used in preparing these basecoats can be used in the practice of this invention. Also, water-based polyurethanes such as those prepared in accordance with U.S. Pat. No. 4,147,679 can be used as the resinous binder in the paint layer.

Tie-layers can be formed from compositions comprising an adhesion promoting species and optionally a solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY N-50 sold by Mobay, VINAC B-15 sold by Air Products, ELVACITE sold by DuPont, and LEXAN sold by General electric. Suitable solvents include methylethyl ketone, methylene chloride, tetrahydrofuran, toluene, methyl cellosolve, methanol, ethanol, propanol, butanol, mixtures thereof and the like. The tie-layer preferably has a thickness not greater than about 0.0025 millimeter and preferably is much thinner than the pigmented inner layer applied to it.

Compositions for the clear topcoat layer 15 in FIGS. 1 and 2 are two-component crosslinkable polymeric compositions which are useful as clearcoats for automotive surface finishing. They are transparent and comprise (a) as one component, a crosslinkable polymeric polyol such as a polyester polyol, a polyurethane polyol, or polyether polyol and (b) as a second component, a polyisocyanate curing or crosslinking agent. Each component is dissolved in a volatile organic solvent such as acetone, toluene or a mixture of acetone and toluene.

The dry thickness of the clear topcoat layer can range from about 0.05 to 0.2 mm and is preferably in excess of about 0.06 mm.

Especially preferred for the topcoat is a two-package system comprising a polyurethane polyol and a poly isocyanate crosslinking agent as disclosed in the patent to Porter, U.S. Pat. No. 4,719,132. The isocyanate component can be either an aliphatic or an aromatic polyisocyanate containing two or more isocyanate groups. Examples include 1,6-hexamethylene diisocyanate, especially in the form of the isocyanate of 1,6-hexamethylene diisocyanate supplied by Mobay Chemical Company as KL5244. Other examples include toluene diisocyanate, 4,4-methylene-bis(cyclohexyl isocyanate) and the isocyanurate from isophorone isocyanate supplied by Veba Company as T1890. Also useful are blocked polyisocyanates which unblock when the coating composition is heated to curing temperature. Aliphatic isocyanates are greatly preferred because of their superior resistance to discoloring.

Other useful clearcoat compositions include those described in the patents to Ambrose et al. U.S. Pat. No. 4,699,814; Simpson et al, U.S. Pat. No. 4,650,718; Singer et al, U.S. Pat. No. 4,681,811; Singer et al, U.S. Pat. No. 4,703,101; and Backhouse, U.S. Pat. No. 4,220,679 and U.S. Pat. No. 4,403,003.

The dry thickness of each of the dark colored basecoat layer and of the flake-containing layer can range, for example, from about 0.012 to about 0.08 mm. Highly preferred is a dry thickness from about 0.02 to 0.06 mm for each of these layers.

The laminar flow coating techniques that preferably are used include direct extrusion onto the moving carrier film web by use of an extrusion hopper which applies the coating composition by a bead coating or a stretch-flow coating mechanism, extrusion of the coating composition through a slot with subsequent travel down the slide surface of a slide hopper or subsequent free fall in a curtain coating process, curtain coating processes in which the curtain is generated by the use of an overflow weir, and so forth, as further described in Reafler patent application Ser. No. 116,426.

In sheet material of the invention the carrier film, the dark colored layer, the flake-containing layer, the clear topcoat layer and the adhesive layer, if any, have heat softening and tensile elongation properties which render the sheet material suitable for use in the thermoforming process. These properties are mutually compatible so as to permit symmetrical elongation, whereby the sheet material can undergo substantial elongation by the application of stretching forces without crazing or delamination. The carrier film and the layers coated thereon are of sufficiently uniform character that the sheet material exhibits substantially the same uniformity of appearance before and after the thermoforming process.

The sheet material can be stretched and bonded to a substrate by thermoforming with vacuum. Stretching necessarily occurs when applying the sheet material to a three-dimensional substrate. It may be necessary or desirable also to stretch the material when bonding it to a flat substrate. In either case, stretching can cause loss of flop and other qualities in sheet materials having a metallic paint layer.

In vacuum thermoforming, the sheet material is softened by heating, e.g., with banks of infra-red lamps or with ceramic heaters to a typical temperature of 115°–150° C., and is drawn by vacuum and plastically stretched to conform to the shape of the substrate. Portions of the sheet material may be stretched to an area which is up to 100% or even 150% greater than its unstretched area. The material is thus brought into conforming contact with the surface of the substrate and is securely bonded to the substrate to form a smooth protective and decorative surface.

A method of adhesively thermoforming a paint-coated film onto a substrate is disclosed in the patent to Short U.S. Pat. No. 4,769,100.

The sheet material can also be used in the type of thermoforming process known as the "in-mold" process. In this process a shaped article is molded and is simultaneously provided with a protective and decorative surface. The method comprises (1) positioning the sheet material in a mold, the clear topcoat layer being against the surface of the mold; (2) injecting into the mold a plastic composition which hardens to form the shaped article and bonds to the carrier film; and (3) removing from the mold a shaped article having the sheet material bonded thereto. An adhesive layer on the back side of the sheet material normally is not required for the in-mold process because the carrier film of the sheet material bonds to the plastic article by fusion.

In the in-mold process the sheet material can be integrally bonded, for example, to a molded elastomeric article. In this instance, the sheet material is placed in a mold cavity, and an elastomeric molding compound, such as a urethane rubber, is injected into the mold cavity under pressure against the carrier film side of the sheet material. The sheet material stretches as it conforms to the shape of the molded article and bonds to the outer surface of the article. It is preferred in the in-mold process to preform the sheet material by vacuum thermoforming to conform to the mold surface before placing it in the mold. This technique is described in European Patent Application 285,071 A2 published Oct. 5, 1988 of Avery International Corporation, and in Item 24303 of Research Disclosure Jul., 1984.

The invention is further illustrated by the following examples.

EXAMPLE 1

Part A

A carrier film was prepared from a blend described in U.S. Pat. No. 4,582,876 as follows.

A mixture of 55:45% by weight of polyester (1) and Dylark ® Styrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°–290° C. and extruded through a die into a nip comprising two temperature-controlled chrome plated stainless steel rollers. The extruded web was then cooled on a chill roller. The thermoplastic film had a mean thickness of about 0.2 mm and a maximum thickness deviation of less than 0.2 mm.

The carrier film prepared as described was coated with a thin layer of an aqueous tie-coat composition as described Table I. After drying, the thickness of the tie-layer was approximately 0.0005 mm.

TABLE I

| Tie-Coat Composition | |
|---|---|
| Ingredient | Approx. % Weight |
| Melamine-Formaldehyde Resin | 1 |
| Ethylene Glycol Monohexyl Ether | <1 |
| Deionized Water | 75 |
| Toluene | 1 |
| Normal Butyl Alcohol | <1 |
| N,N-Diethyl Ethanolamine | <1 |
| N-Methylpyrrolidone | 2 |
| Diethylene Glycol Monobutyl Ether | 1 |
| Acrylic Resin* | 9 |
| Urethane Resin** | 9 |
| FC170 Surfactant, sold by 3M Co. diluted with water to a total solids content of 3.0% by weight | 0.05 |

*Styrene-butyl acrylate-butyl methacrylate terpolymer
**Reaction product of methylene dicyclohexyl diisocyanate and an aliphatic diol Over the dried tie-layer was then coated an aqueous polyurethane black paint composition as listed in Table II. The resulting layer was dried to a thickness of about 0.04 mm. Its L* value was approximately 4.6.

TABLE II

| Black Paint Composition | |
|---|---|
| Ingredient | Approx. % Weight |
| Melamine-Formaldehyde Resin | 1 |
| Carbon Black | 1 |
| Ethylene Glycol Monohexyl Ether | 5 |
| Toluene | 1 |
| N,N-Dimethyl Ethanolamine | 1 |
| N-Methylpyrrolidone | 5 |
| Deionized Water | 60 |
| Normal Butyl Alcohol | <1 |
| Diethylene Glycol Monobutyl Ether | 5 |
| Urethane Resin | 20 |

Over the dried pigment layer was coated a flake-containing layer of the composition listed in Table III. The layer was dried to a thickness of about 0.04 mm.

TABLE III

| Ingredient | Approx. % Weight |
|---|---|
| Melamine-Formaldehyde Resin | 5 |
| Deionized Water | 50 |
| Urethane Resin | 20 |
| Aluminum Paste (flakes) | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |
| Toluene | 5 |
| Normal Butyl Alcohol | <1 |

The coverage of aluminum flakes in the above described light-reflective layer was about 100 mg/m².

Over the dried flake-containing layer was coated a clearcoat layer of the composition described in Table IV.

TABLE IV

| Clearcoat Composition | | |
|---|---|---|
| Ingredient | | Approx. % Weight |
| A | Urethane Resin | 60 |
|  | Toluene | 39 |
|  | Benzotriazole | 1 |
| B(*) | Polyfunctional aliphatic isocyanurate resin based on 1,6-hexamethylene diisocyanate | 100 |

(*)Available as Desmodur N-3300 from Mobay Corporation Coatings Division

Ingredient A diluted to 53% with acetone and Ingredient B diluted to 70% solids with a 50/50 mixture of acetone and toluene were mixed and coated onto the paint layer and dried to form a clear layer having a thickness of 0.06 mm.

The dried, clear-coated sheet material was wound on a take-up roll, then unwound, and once more drawn through a coating station to form on the backside of the carrier film opposite the tie-layer a thin layer of a pressure-sensitive adhesive which, upon continuous drying to a tacky state, had a thickness of 0.07 mm. The adhesive was a clear, aqueous acrylic adhesive comprised of 50 weight percent water and 50 weight percent acrylic resin. It is supplied as "Shrink Wrap Adhesive HC7803-VAC" by PPG Industries, Inc. of Pittsburgh, PA.

A thin polyester film having a thickness of about 0.04 mm was applied to the backside adhesive layer as a temporary protective release sheet to permit handling of the sheet material prior to its use.

The so prepared sheet material was identified as Sample 1-A.

Part B

The procedure described in Part A was repeated except that the coating composition shown in Table III was changed to give a coverage of aluminum flakes in the flake-containing layer of about 250 mg/m². This sheet material was identified as Sample 1-B.

Part C

The procedure described in Part A was repeated except that the coating composition shown in Table III was changed to give a coverage of aluminum flakes in the flake-containing layer was changed to about 500 mg/m². This sheet material was identified as Sample 1-C.

Part D

The procedure described in Part A was repeated except that the coating composition shown in Table III was changed to give a coverage of aluminum flakes in the flake-containing layer of about 1000 mg/m². This sheet material was identified as Sample 1-D.

Part E

The procedure described in Part A was repeated except that the coating composition shown in Table III was changed to give a coverage of aluminum flakes in the flake-containing layer of about 2000 mg/m². This sheet material was identified as Sample 1-E.

After removal of the protective release sheet from the backside of the carrier film, a 7×16 inch sheet of the sample was drawn by vacuum thermoforming into contact with an inclined metal test panel and adhesively bonded thereto. The sample was heated by infrared lamps to 135° C. before initiating the vacuum drawdown. As it was drawn onto the inclined test panel, the sample was stretched an amount proportional to the distance along the panel, the area at the top of the panel having little or no stretch and the area at the bottom having the maximum stretch of about 100 percent.

The geometric metamerism (flop) of selected areas of the stretched sheet materials was measured by the method disclosed in U.S. Pat. No. 4,479,718 and calculated by the following modification of the Alman Equation:

$$\text{Flop} = 15(L^*_1 - L^*_3)^{1.11}/L^*_2{}^{0.86}$$

wherein $L^*_1$, $L^*_2$ and $L^*_3$ are the lightness values measured at 15°, 45° and 110° intervals away from the specular reflection angle. (While the unmodified Alman equation uses 2.69 as the multiplier, applicant has chosen the value 15 solely for the purpose of establishing a more readable scale and to eliminate decimal places).

The readings were made with a Murakami Goniospectrophotometer at the reflection angles:

$$L^*_1 = -30°$$

$$L^*_2 = 0°$$

$$L^*_3 = +65°$$

using a CIELAB value with D65 illumination and a 10° viewer at the above defined $L^*_1$, $L^*_2$, $L^*_3$ reflection angles and a 45° incidence angle.

The results are numerically listed in Table V.

TABLE V

| Effect of Stretch on Flop | | | | | |
|---|---|---|---|---|---|
|  | Sample | | | | |
|  | 1-A | 1-B | 1-C | 1-D | 1-E |
| Top | 129 | 129 | 119 | 103 | 109 |
| Center | 137 | 133 | 127 | 115 | 106 |
| Bottom | 151 | 141 | 138 | 116 | 109 |
| Flake Coverage (mg/m²) | (100) | (250) | (500) | (1000) | (2000) |

EXAMPLE 2

Part A

The procedure described in Part A of Example 1 was repeated with a sheet material wherein the coverage of aluminum flakes in the flake-containing layer was increased to 3,000 mg/m².

This sheet material was identified as Sample 2-A.

Part B

The procedure described in Part A of Example 1 was repeated with a sheet material wherein the coverage of aluminum flakes in the flake-containing layer was increased to 5880 mg/m²

This sheet material was identified as Sample 2-B.

Part C

The procedure described in Part A of Example 1 was repeated with a sheet material wherein the coverage of aluminum flakes in the flake-containing layer was increased to 8800 mg/m².

This sheet material was identified as Sample 2-C.

The results are listed in Table VI.

TABLE VI

Effect of Stretch on Flop

| | Sample | | |
|---|---|---|---|
| | 2-A | 2-B | 2-C |
| Top | 111 | 107 | 105 |
| Center | 105 | 97 | 79 |
| Bottom | 97 | 93 | 74 |
| Flake Coverage (mg/m²) | (3000) | (5880) | (8800) |

The data demonstrate the advantage offered by sheet materials of the invention which have relatively low flake coverage, e.g., within the range from about 100 to about 2,000 mg/m² for a flake layer of 0.04 mm (1.5 mils) thickness. Such a flake concentration provides a better flop and retention of flop in stretched areas (Table V) than does a flake coverage in excess of about 2,000 mg/m² (Table VI).

EXAMPLE 3

Sheet materials were prepared as in the preceding examples wherein the black paint layer was replaced with a dark blue paint layer (L* approx. 6.5) coated from the composition listed in Table VII below.

TABLE VII

Blue Paint Composition

| Ingredient | Approx. % Weight |
|---|---|
| Melamine-Formaldehyde Resin | 2–5 |
| Copper Phthalocyanine | 2–5 |
| Carbon Black | <1 |
| Titanium Dioxide | 1–2 |
| Ethylene Glycol Monohexyl Ether | 2–5 |
| Deionized Water | 50–55 |
| Normal Butyl Alcohol | <1 |
| Toluene | 2–5 |
| N,N-Dimethyl Ethanolamine | 1–2 |
| Diethylene Glycol Monobutyl Ether | 2–5 |
| N-Methylpyrrolidone | 5–10 |
| Diisopropanolamine | <1 |
| Urethane Resin | 15–20 |

Part A

In a first sample, identified as Sample 3-A, the light-reflective flake layer contained aluminum flakes at a coverage of 250 mg/m².

Part B

In a second sample, identified as Sample 3-B, the light-reflective flake layer contained aluminum flakes at a coverage of 500 mg/m².

Part C

In a third sample, identified as Sample 3-C, the light-reflective flake layer contained aluminum flakes at a coverage of 1000 mg/m².

Part D

In a fourth sample, identified as Sample 3-D, the light-reflective flake layer contained aluminum flakes at a coverage of 2000 mg/m².

The results are listed in Table VIII.

TABLE VIII

Effect of Stretch on Flop

| | Sample | | | |
|---|---|---|---|---|
| | 3-A | 3-B | 3-C | 3-D |
| Top | 104 | 102 | 97 | 104 |
| Center | 104 | 110 | 107 | 107 |
| Bottom | 109 | 114 | 115 | 122 |

TABLE VIII-continued

Effect of Stretch on Flop

| | Sample | | | |
|---|---|---|---|---|
| | 3-A | 3-B | 3-C | 3-D |
| Flake Coverage (mg/m²) | (250) | (500) | (1000) | (2000) |

EXAMPLE 4

In another sample, identified as Sample 4, the basecoat layer was coated from the blue paint composition of Table VII, and the light-reflective flake layer contained aluminum flakes at a coverage of 3000 mg/m².

The results are listed in Table IX.

TABLE IX

Effect of Stretch on Flop

| Sample | |
|---|---|
| Top | 103 |
| Center | 99 |
| Bottom | 92 |
| Flake Coverage (mg/m²) | (3000) |

The data in Tables V, VI, VIII AND IX demonstrate that flake coverages in the range up to about 2000 mg/m² provide unexpectedly better retention of flop than does a coverage beyond that range.

EXAMPLE 5

Gloss and DOI readings were taken of selected areas of Samples 3-A, 3-B, 3-C, 3-D and 4. The gloss measurements were made by ASTM Method D-2457 at the top, center and bottom of each panel, thus obtaining measurements at the areas of minimum, medium and maximum stretching. A Hunter 20-Degree ASTM Glossmeter was used. Distinctness of Image was measured in the same areas by the ASTM Method E-430 using a Hunterlab Model D47R-6 Dorigon Glossmeter.

The results are listed in Tables X and XI.

TABLE X

Effect of Stretch on 20° Gloss

| | Sample | | | | |
|---|---|---|---|---|---|
| | 3-A | 3-B | 3-C | 3-D | 4 |
| Top | 88 | 90 | 91 | 92 | 92 |
| Center | 85 | 89 | 90 | 90 | 72 |
| Bottom | 85 | 83 | 82 | 81 | 45 |
| Flake Coverage (mg/m²) | (250) | (500) | (1000) | (2000) | (3000) |

Result: Loss of gloss occurred in stretched areas of the sample containing flake in excess of 2000 mg/m².

TABLE XI

Effect of Stretch on DOI

| | Sample | | | | |
|---|---|---|---|---|---|
| | 3-A | 3-B | 3-C | 3-D | 4 |
| Top | 93 | 83 | 89 | 76 | 63 |
| Center | 85 | 70 | 66 | 71 | 15 |
| Bottom | 69 | 50 | 37 | 38 | 4 |
| Flake Coverage (mg/m²) | (250) | (500) | (1000) | (2000) | (3000) |

Result: Loss of DOI occurred in stretched areas of the sample containing flake in excess of 2000 mg/m².

EXAMPLE 6

A paint-coated film was prepared as described in Exampl 1 except that the black paint layer was replaced with a light grey paint consisting of a blend of 80 parts by weight of the white paint composition described in Table XII below and 20 parts by weight of the black paint composition of Table II. the resulting grey paint layer had an L* value in excess of 63.

TABLE XII

White Paint Composition

| Ingredient | Approx. % Weight |
| --- | --- |
| Titanium Dioxide | 25 |
| Ethylene Glycol Monohexyl Ether | 5 |
| Diethylene Glycol Monobutyl Ether | 1 |
| Deionized Water | 45 |
| N,N-Dimethyl Ethanolamine | 1 |
| N-Methylpyrrolidone | 5 |
| Urethane Resin | 20 |

Five separate samples of the film were overcoated first with a flake-containing layer of the composition described in Table III and then with a clearcoat layer of the composition described in Table IV above. The samples were identified as Samples 5-A to 5-E. The flake coverage in the five samples ranged from 100 to 2,000 mg/m$^2$.

Each sample was bonded to a substrate and then evaluated as described in Example 1. The results are listed in Table XII.

TABLE XIII

Effect of Stretch on Flop

| | Sample | | | | |
| --- | --- | --- | --- | --- | --- |
| | 5-A | 5-B | 5-C | 5-D | 5-E |
| Top | 17 | 35 | 54 | 80 | 76 |
| Center | 14 | 34 | 48 | 76 | 71 |
| Bottom | 10 | 24 | 33 | 56 | 50 |
| Flake Coverage mg/m$^2$ | 100 | 250 | 500 | 1,000 | 2,000 |

Result: In contrast to the samples containing a dark paint layer according to the invention (see Table V), the samples listed in Table XII displayed (a) a lower flop value in unstretched areas and (b) a loss, rather than a retention or increase, of flop on stretching.

EXAMPLE 7

The flop values of an additional sample of a paint-coated film (Sample 6) as described in Example 6 but having a flake coverage of 3000 mg/m$^2$ are listed in Table XIII.

TABLE XIV

Effect of Stretch on Flop

| | Sample 6 |
| --- | --- |
| Top | 104 |
| Center | 103 |
| Bottom | 89 |
| Flake Coverage (mg/m$^2$) | 3,000 |

Result: As with Sample 2-A (Table VI) and Sample 4 (Table IX), the flop value of Sample 6 declined on stretching. In these tests the flake coverage was so high (e.g., 3,000 mg/m$^2$) that the flake-containing layer was not sufficiently transparent and the dark layer was not sufficiently visible through the flake-containing layer. Hence, the benefit of high flop retention on stretching was not achieved.

EXAMPLE 8

Another paint-coated film was prepared as in previous examples but the paint layer was formed by a black paint composition which contained a small concentration of mica flakes. Table XV below lists the ingredients of the paint composition.

TABLE XV

| Ingredient | Approx. % Weight |
| --- | --- |
| Titanium Dioxide/Mica # | <1 |
| Silica, Amorphous-Gel | <1 |
| Carbon Black | <1 |
| Ethylene Glycol Monohexyl Ether | 5 |
| Deionized Water | 55 |
| Isopropyl Alcohol, Anhydrous | <1 |
| Diethylene Glycol Monobutyl Ether | 1 |
| N,N-Dimethyl Ethanolamine | 1 |
| N-Methylpyrrolidone | 5 |
| Urethane Resin | 20 |

The resulting film was stretched and bonded to test panels by vacuum thermoforming as in previous examples and measurements were made of flop and of gloss and DOI at the top, center and bottom of each panel. Results are listed in Table XVI.

TABLE XVI

| Area of Panel | 20° Gloss | DOI | Flop (Range) |
| --- | --- | --- | --- |
| Top | 85 | 84 | 97–102 |
| Center | 79 | 62 | 101–106 |
| Bottom | 55 | 28 | 100–103 |

The table shows that although the flop remained fairly consistent with increased stretching (i.e., lowest stretch at top and greatest at bottom), the 20° Gloss and DOI decreased markedly for a film having a paint layer in which the flake material was mixed with the dark paint.

The invention has been described in detail with particular reference to preferred embodiments thereof, but it will be understood that variations and modifications can be effected within the spirit and scope of the invention.

What is claimed is:

1. A flexible and stretchable sheet material adapted for use in a thermoforming process in which it is stretched and bonded to a substrate to form thereon a decorative and protective surface having a high degree of geometric metamerism, said sheet material comprising:

a series of layers including (a) a stretchable, thermoplastic polymeric carrier film having heat-softenable and tensile elongation properties which adapt it to use in said thermoforming process and (b) a clear topcoat layer;

one of said series of layers being a dark colored layer which has an L* value less than about 60;

above said dark colored layer, a flake-containing layer which is light transmissive and comprises light-reflective flakes dispersed in a transparent film-forming binder;

the flake concentration in the flake-containing layer being sufficiently low that the dark colored layer is visible through the flake-containing layer and the topcoat; all of said layers having heat-softening and tensile elongation properties that are compatible with those of the carrier film; and said sheet material being capable of stretching at least 100 percent during thermoforming and, when stretched, exhibiting a flop in areas stretched up to 100 percent at least equal to the flop of the unstretched material.

2. A sheet material according to claim 1 wherein the flake-containing layer contains metal flakes at a coverage less than 3000 mg/m².

3. A sheet material according to claim 2 wherein the dark colored layer is a basecoat layer coated on the carrier film.

4. A flexible and stretchable sheet material adapted for use in a thermoforming process in which it is stretched and bonded to a three-dimensional substrate to form thereon a decorative and protective surface having a high degree of geometric metamerism, said sheet material comprising:
(a) a dark colored film comprising a stretchable, thermoplastic polymeric carrier film having heat-softenable and tensile elongation properties which adapt it to use in said thermoforming process, said dark colored film having an L* value less than about 60;
(b) on the surface of the dark colored film a flake-containing layer comprising light-reflective flakes dispersed in a transparent film-forming binder;
(c) a clear topcoat layer;
the flake concentration in the flake-containing layer being sufficiently low that the dark colored film is visible through the flake-containing layer and the topcoat;
said layers having heat-softening and tensile elongation properties that are compatible with those of the carrier film; and
said sheet material being capable of stretching at least 100 percent during thermoforming and, when stretched, exhibiting a flop in areas stretched up to 100 percent at least equal to the flop of the unstretched material.

5. A sheet material of claim 4 wherein the flake-containing layer contains metal flakes at a coverage from 100 to 2000 mg/m².

6. A sheet material of claim 4 wherein the metal flakes are aluminum flakes.

7. A sheet material of claim 4 wherein the flake concentration is sufficiently high that at least about 2 percent of the area of the dark colored film as viewed through the flake-containing layer, is covered by flakes.

8. A sheet material of claim 4 wherein the dark colored film comprises a carrier film having a dark colored paint layer thereon.

9. A sheet material of claim 8 wherein the paint layer contains carbon black.

10. A sheet material of claim 4 wherein the clear topcoat layer comprises a polyurethane resin obtained by the reaction of a polyisocyanate crosslinking agent with a polymeric polyol.

11. A sheet material of claim 8, wherein the dark colored paint layer, the light-transmissive flake-containing layer, and the clear topcoat layer are formed by a laminar-flow coating method.

12. A sheet material of claim 11 wherein said light-reflective flakes have substantially flat faces and at least 75 percent of said flakes have said flat faces within about 12° of parallelism with respect to the surface of the topcoat layer.

13. A bonded article comprising a thermoformed and stretched protective and decorative sheet material bonded to a three-dimensional substrate and having the appearance of a clearcoat/basecoat finish, said sheet material comprising:
a series of layers including (a) a stretchable, thermoplastic polymeric carrier film having heat-softenable and tensile elongation properties which adapt it to use in said thermoforming process and (b) a clear topcoat layer;
one of said series of layers being a dark colored layer which has an L* value less than about 60;
above said dark colored layer, a flake-containing layer which is light transmissive and comprises light-reflective flakes dispersed in a transparent film-forming binder;
the flake concentration in the flake-containing layer being sufficiently low that the dark colored layer is visible through the flake-containing layer and the topcoat; all of said layers having heat-softening and tensile elongation properties that are compatible with those of the carrier film; and
said sheet material being stretched at least 100 percent during thermoforming and exhibiting a flop in areas stretched up to 100 percent at least equal to the flop of the unstretched material.

14. A bonded article of claim 13 wherein the sheet material exhibits a flop of at least 95 in both unstretched areas and areas stretched up to 100%.

15. A bonded article of claim 13 wherein the sheet material exhibits a 20° gloss of at least 80 in both unstretched areas and in areas stretched up to 100%.

16. A bonded article of claim 13 wherein the sheet material exhibits a DOI of at least 75 in unstretched areas and at least 35 in areas stretched up to 500%.

17. A bonded article according to claim 11 wherein the dark colored layer is a paint layer coated on the carrier film and has an L* value less than 60.

* * * * *